United States Patent
DiMatteo et al.

(10) Patent No.: US 12,209,615 B2
(45) Date of Patent: Jan. 28, 2025

(54) ANTI-ROTATION SNAP RING TO PREVENT BEARING CREEP

(71) Applicant: JTEKT Bearings North America LLC, Greenville, SC (US)

(72) Inventors: Giovanni DiMatteo, Milford, MI (US); Kyle Sorrells, Greer, SC (US); Chace Graham, Central, SC (US)

(73) Assignee: JTEKT Bearings North America LLC, Greenville, SC (US)

( * ) Notice: Subject to any disclaimer, the term of this patent is extended or adjusted under 35 U.S.C. 154(b) by 0 days.

(21) Appl. No.: 17/921,615

(22) PCT Filed: Apr. 28, 2021

(86) PCT No.: PCT/US2021/029679
§ 371 (c)(1),
(2) Date: Oct. 26, 2022

(87) PCT Pub. No.: WO2021/222430
PCT Pub. Date: Nov. 4, 2021

(65) Prior Publication Data
US 2023/0193957 A1   Jun. 22, 2023

Related U.S. Application Data

(60) Provisional application No. 63/016,614, filed on Apr. 28, 2020.

(51) Int. Cl.
F16C 19/26 (2006.01)
F16C 35/063 (2006.01)
F16C 35/067 (2006.01)

(52) U.S. Cl.
CPC .......... *F16C 35/067* (2013.01); *F16C 19/26* (2013.01); *F16C 35/063* (2013.01); *F16C 2226/74* (2013.01)

(58) Field of Classification Search
CPC ...... F16B 21/18; F16B 21/183; F16B 21/186; F16C 19/26; F16C 35/067; F16C 2226/74; F16C 35/063
See application file for complete search history.

(56) References Cited

U.S. PATENT DOCUMENTS

| | | | | |
|---|---|---|---|---|
| 3,401,436 | A | * | 9/1968 | Bradshaw ............. F16C 35/067 24/456 |
| 5,059,844 | A | * | 10/1991 | Anstine ................. F16C 35/067 310/90 |
| 2012/0051906 | A1 | * | 3/2012 | House ................... F16C 35/067 415/229 |

FOREIGN PATENT DOCUMENTS

| | | |
|---|---|---|
| DE | 102012019965 A1 | 5/2014 |
| DE | 102014107370 A1 | 11/2015 |

(Continued)

OTHER PUBLICATIONS

International Search Report and Written Opinion for International Application No. PCT/US2021/029679 mailed Aug. 19, 2021.

*Primary Examiner* — Phillip A Johnson
(74) *Attorney, Agent, or Firm* — Nelson Mullins Riley & Scarborough LLP

(57) ABSTRACT

An anti-rotation assembly for use in preventing rotation of an outer race of a radial bearing with regard to a housing in which the radial bearing is mounted, the assembly including a housing with a cylindrical bore defined by an inner surface and a side wall, a recess extending radially-outwardly from the inner surface of the cylindrical bore, and a snap ring including a pair of protrusions extending radially-outwardly therefrom, wherein the pair of projections are selectively received within the recess, thereby preventing rotation of the snap ring with respect to the housing.

10 Claims, 4 Drawing Sheets

(56) References Cited

FOREIGN PATENT DOCUMENTS

| | | | |
|---|---|---|---|
| DE | 102019118809 A1 * | 1/2021 | |
| EP | 1681477 A1 | 7/2006 | |
| EP | 2913540 A2 | 9/2015 | |
| EP | 3225864 A1 | 10/2017 | |
| JP | H0914276 A | 1/1997 | |
| JP | 2005207571 A | 8/2005 | |
| JP | 2016125536 A | 7/2016 | |
| JP | 2017106527 A | 6/2017 | |
| WO | 2010/097969 A1 | 9/2010 | |
| WO | 2010/129407 A2 | 11/2010 | |

* cited by examiner

ANTI-ROTATION SNAP RING TO PREVENT BEARING CREEP

CLAIM OF PRIORITY

This application claims priority to U.S. provisional patent application No. 63/016,614 filed Apr. 28, 2020, the disclosure of which is incorporated by reference herein.

TECHNICAL FIELD

The presently-disclosed invention relates generally to radial bearings and, more specifically, to a device to help prevent bearing creep.

BACKGROUND

Often, a radial bearing is mounted within a corresponding housing by fitting an outer race of the radial bearing within a bore formed within the housing. Bearing creep is the undesirable rotation of a radial bearing's outer race relative to the housing in which the outer race is received. The relative rotation of the outer race within the bore can lead to wear of the housing bore. Wear of the housing bore may lead to contamination within the related system due to wear fragments, loss of system stiffness, and loss of gear mesh alignment, which may lead to application failure, gear failure, and possible power transmission failure.

Snap rings are sometimes used with radial bearing outer races to axially position the radial bearing within the corresponding bore. Typically, traditional snap rings allow the outer race of the radial bearing to still rotate with respect to the housing. Note also, bearing creep may also exist between an inner race of a radial bearing and a shaft on which the inner race may be slidably received.

There at least remains a need, therefore, for devices that are suitable for use in preventing bearing creep in radial bearings.

SUMMARY OF THE INVENTION

One embodiment of the present invention provides an anti-rotation assembly for use in preventing rotation of an outer race of a radial bearing with regard to a housing in which the radial bearing is mounted, having a housing, including a cylindrical bore defined by an inner surface and a side wall, a recess extending radially-outwardly from the inner surface of the cylindrical bore, and a snap ring including a pair of protrusions extending radially-outwardly therefrom, wherein the pair of projections are selectively received within the recess, thereby preventing rotation of the snap ring with respect to the housing.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Figure 1A:
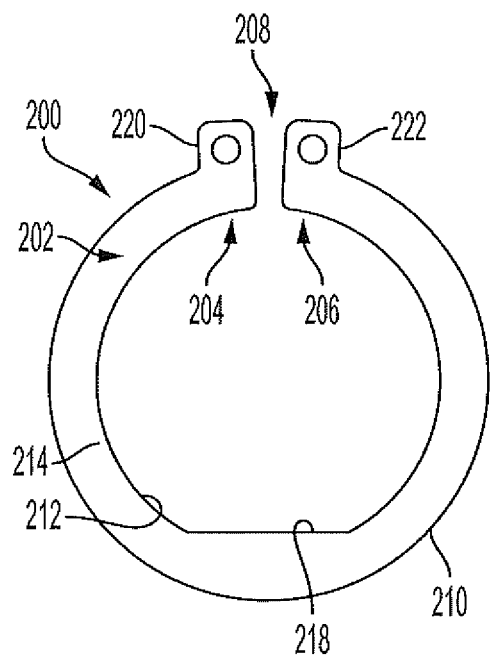
FIGS. 1A and 1B are side plan views of an anti-rotation snap ring for use in preventing bearing creep, in accordance with an embodiment of the present invention.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Figure 1B:
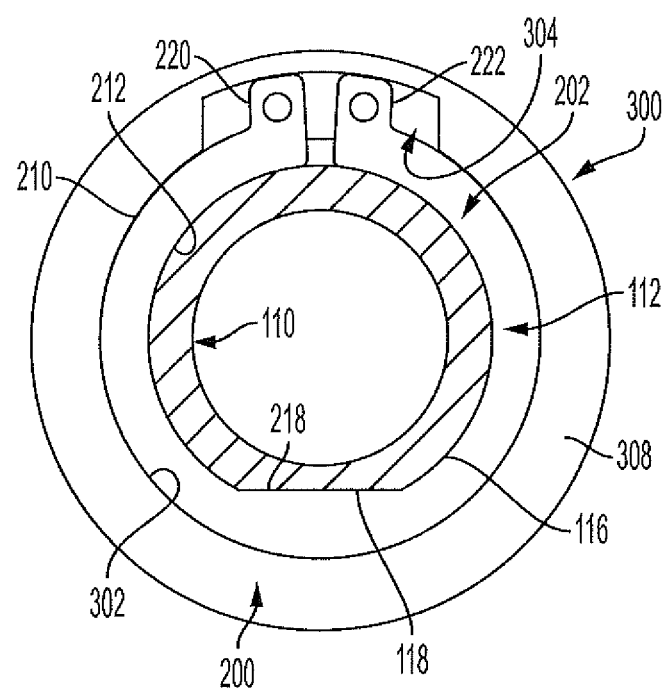
Figure 5:
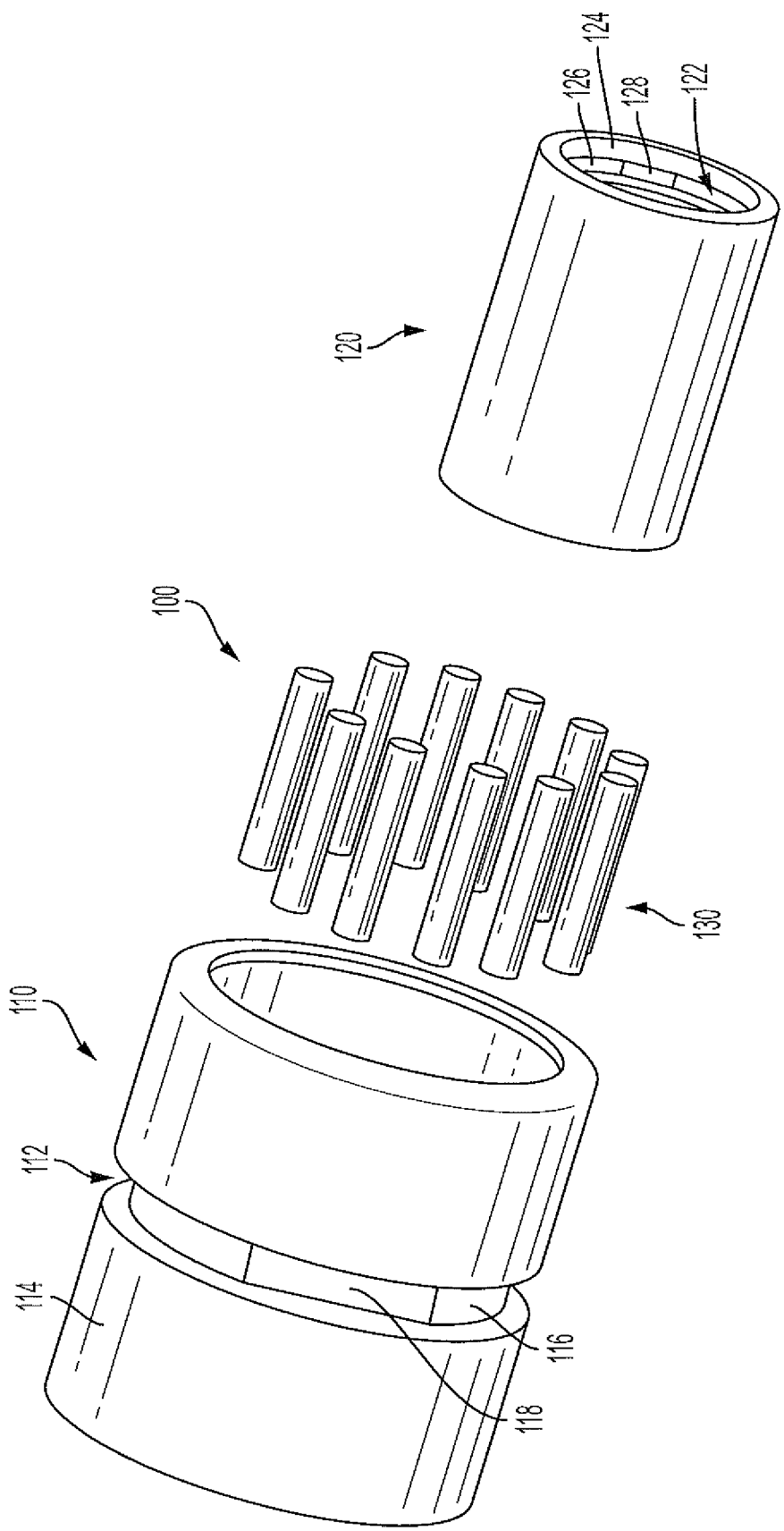
FIG. 5 is an exploded perspective view of a radial roller bearing in accordance with an embodiment of the present invention.

Referring now to FIGS. 1A, 1B, and 5, a radial roller bearing 100 including an anti-rotation snap ring 200 that is configured for the prevention of bearing creep is shown. Radial roller bearing 100 includes an outer race 110, or outer cup, with an inner race 120, or inner cup, rotatably disposed therein, and a plurality of roller elements 130 rotatably disposed therebetween. As shown, the plurality of roller elements 130 includes needle rollers but, in alternate embodiments, ball rollers, or a combination thereof, may be utilized. As best seen in FIG. 5, the outer race 110 of radial roller bearing 100 includes an annular groove 112 formed in its outer surface 114, the annular groove 112 being configured to receive the snap ring 200 therein. Preferably, the bottom wall 116 of the annular groove 112 is substantially cylindrical, with the exception of a flat surface portion 118 formed thereon. As shown in FIG. 1A, the snap ring 200 includes a substantially cylindrical body portion 202 having a first end portion 204 and a second end portion 206 forming a gap 208 therebetween. The body portion 202 of the snap ring 200 includes a substantially cylindrical outer perimeter surface 210, a substantially cylindrical inner perimeter surface 212, and a pair of parallel side walls 214 extending therebetween. The inner perimeter surface 212 of the snap ring 200 is substantially cylindrical, with the exception of the gap 208 formed between the first and second end portions 204 and 206 of the body portion 202, and a flat surface portion 218 formed thereon that is of a similar length to the flat surface portion 118 formed in the annular groove 112 of the outer race 110 of the radial roller bearing 100.

Further, the snap ring 200 includes a first projection 220, or ear, and a second projection 222, or ear, that extend radially-outwardly from the first end portion 204 and the second end portion 206, respectively, of the snap ring's body portion 202. The first and the second projections 220 and 222 are utilized to either expand or contract the outermost diameter of the snap ring 200, as is known in the art, and further prevent rotation of the snap ring 200 with respect to the corresponding housing 300 when the radial roller bearing 100 is disposed within a corresponding bore 302 thereof, as discussed in greater detail below.

Figure 7:
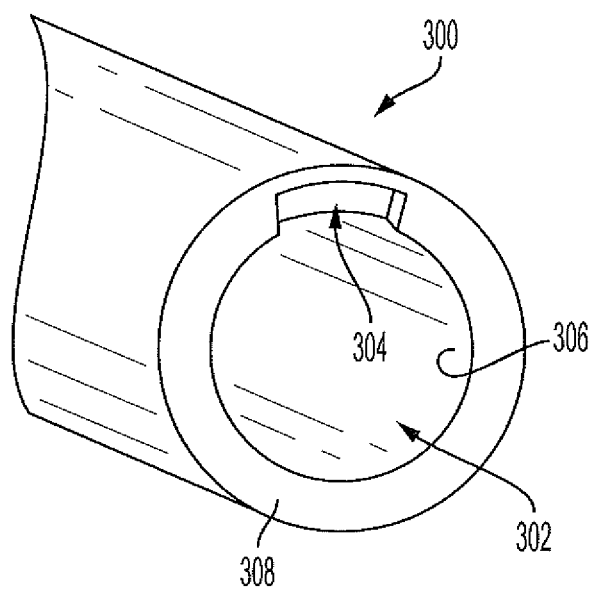
FIG. 7 is a shaft including a key recess for receiving an anti-rotation snap ring and radial roller bearing in accordance with the present invention.

As best seen in FIGS. 1B and 7, the snap ring 200 is configured to prevent the rotation of the outer race 110 of the radial roller bearing 100 when the radial roller bearing 100 is disposed within a corresponding bore 302 of the housing 300. Referring additionally to FIG. 5, formation of an anti-rotation bearing assembly in accordance with the present disclosure is accomplished by first positioning the snap ring 200 within the annular groove 112 formed in the outer surface 114 of the outer race 110 of the radial roller bearing 100. When properly seated, the body portion 202 of the snap ring 200 is received in the annular groove 112 of the outer race 110 so that the flat surface portion 218 of the snap ring 200 is disposed adjacent the flat surface portion 118 of the annular groove 112 of the outer race 110. As such, the flat surface portions 118 and 218 of the outer race 110 and the snap ring 200, respectively, prevent rotation of the snap ring 200 with respect to the outer race 110 of the radial roller bearing 100.

Next, the assembled radial roller bearing 100 and snap ring 200 are inserted into the bore 302 of the housing 300 so that the radially-outwardly depending projections 220 and 222 of the snap ring 200 are received within a key recess 304 that depends radially-outwardly from the inner surface 306 of the bore 302, as best seen in FIG. 1B. As such, rotation of the snap ring 200 with respect to the bore 304 is prevented, meaning that rotation of the outer race 110 of the radial roller bearing 100 with respect to the housing 300 is also prevented. Note, for ease of viewing, the inner race 120 and the plurality of roller elements 130 have been excluded from the view shown in FIG. 1B.

Note, although FIG. 7 shows key recess 304 being disposed adjacent an outer surface 308 of the housing 300 in which the radial roller bearing 100 is received, the key recess 304 may also be formed axially-inwardly of the outer surface 308 of the housing 300. As such, positioning of the first and the second projections 220 and 222 of the snap ring 200 within the key recess 304 can not only prevent rotation of the outer race 110 with respect to the housing 300, but the snap ring 200 can also axially fix the position of the outer race 110 of the radial roller bearing 100 within the bore 302 of the housing 300. As well, in alternate embodiments, when snap ring 200 is disposed within the annular groove 112 of the outer race 110 of the radial roller bearing 100, the outer perimeter surface 210 of the snap ring 200 may extend radially-outwardly beyond the outer surface 114 of the outer race 110. In such an embodiment, the outer perimeter surface 210 of the snap ring 200 is received within an annular groove (not shown) which extends radially-outwardly from the inner surface 306 of the bore 302 of the housing 300.

Figure 2A:
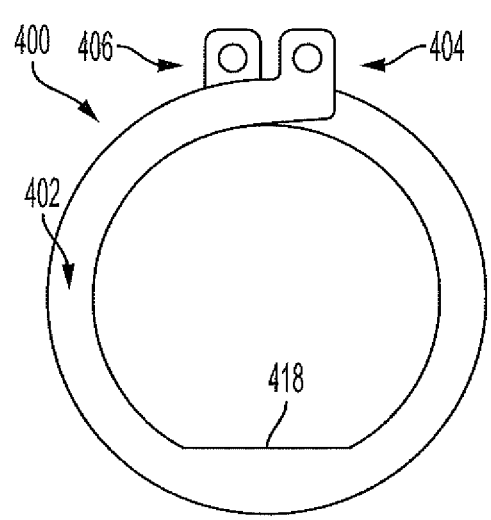
FIGS. 2A and 2B are side plan views of an anti-rotation snap ring in accordance with an alternate embodiment of the present invention.
Figure 2B:
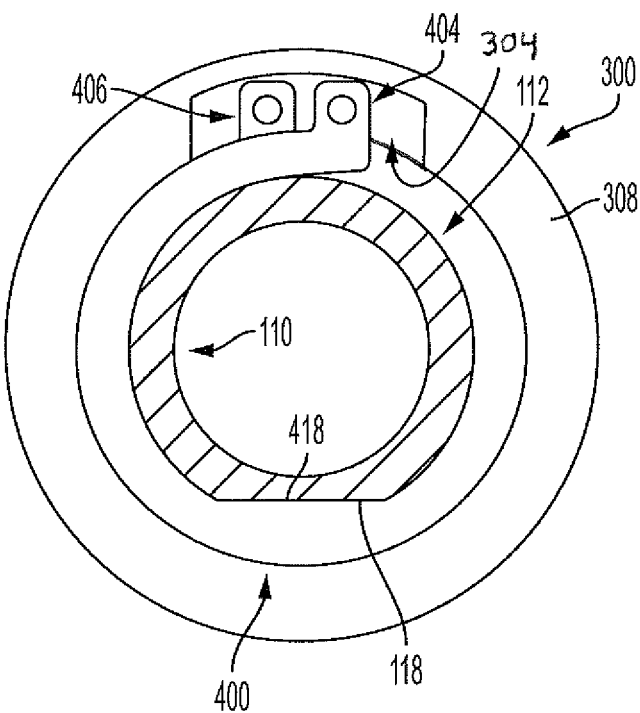

Referring additionally to FIGS. 2A and 2B, an alternate embodiment of an anti-rotation roller bearing assembly is shown. The assembly shown in FIGS. 2A and 2B differs primarily from the previously discussed embodiment in that the body portion 402 of the snap ring 400 does not include a gap (see 208 of FIG. 1A) defined between the first end portion 404 and the second end portion 406 thereof. Rather, the first and second end portions 404 and 406 of the body portion 412 overlap.

Figure 3A:
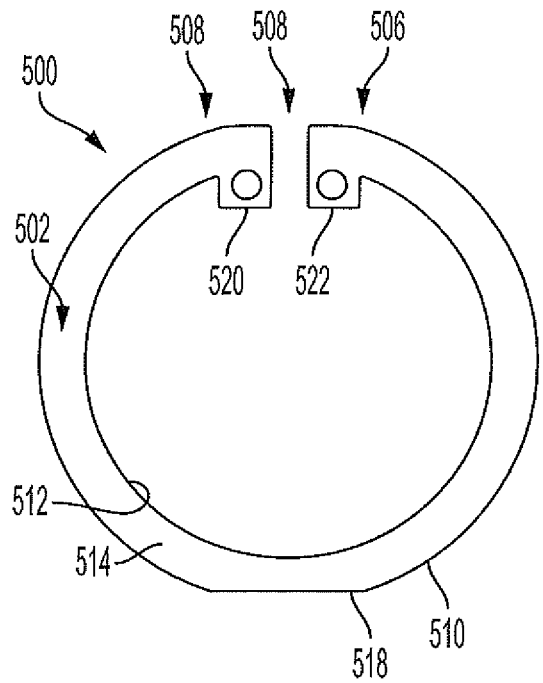
FIGS. 3A and 3B are side plan views of an anti-rotation snap ring in accordance with an alternate embodiment of the present invention.
Figure 3B:
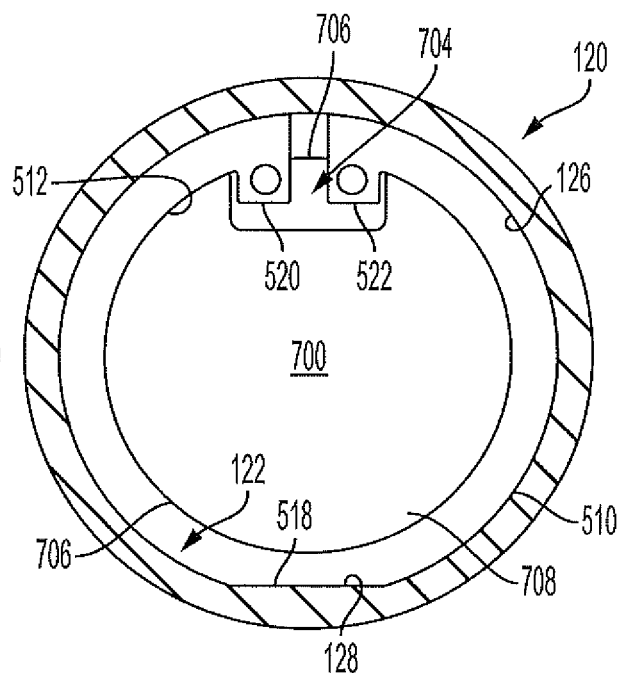

Referring now to FIGS. 3A, 3B, and 5, the inner race 120 of radial roller bearing 100 includes an annular groove 122 formed in its inner surface 124, the annular groove 122 being configured to receive the snap ring 500 therein. Preferably, the bottom wall 126 of the annular groove 122 is substantially cylindrical, with the exception of a flat surface portion 128 formed thereon. As shown in FIG. 3A, the snap ring 500 includes a substantially cylindrical body portion 502 having a first end portion 504 and a second end portion 506 forming a gap 508 therebetween. The body portion 502 of the snap ring 500 includes a substantially cylindrical outer perimeter surface 510, a substantially cylindrical inner perimeter surface 512, and a pair of parallel side walls 514 extending therebetween. The outer perimeter surface 510 of the snap ring 500 is substantially cylindrical, with the exception of the gap 508 formed between the first and second end portions 504 and 506 of the body portion 502, and a flat surface portion 518 formed thereon that is of a similar length to the flat surface portion 128 formed in the annular groove 122 of the inner race 120 of the radial roller bearing 100.

Further, the snap ring 500 includes a first projection 520, or ear, and a second projection 522, or ear, that extend radially-inwardly from the first end portion 502 and the second end portion 506, respectively, of the snap ring's body portion 502. The first and the second projections 520 and 522 are utilized to either expand or contract the outermost diameter of the snap ring 500, as is known in the art, and further prevent rotation of the snap ring 500 with respect to the corresponding shaft 700 when the radial roller bearing 100 is disposed thereon, as discussed in greater detail below.

Figure 6:
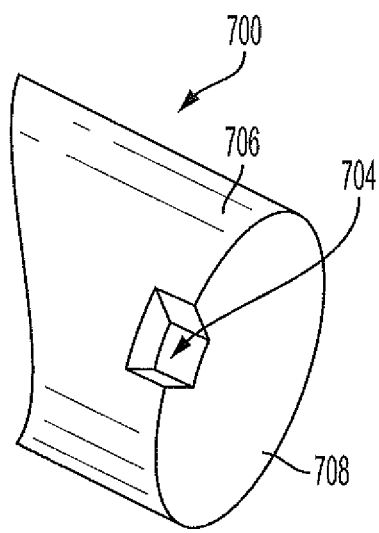
FIG. 6 is a housing including a bore for receiving a radial roller bearing, as shown in FIG. 5, and a corresponding anti-rotation snap ring in accordance with the present invention.

As best seen in FIGS. 3B and 6, the snap ring 500 is configured to prevent the rotation of the inner race 120 of the radial roller bearing 100 when the radial roller bearing 100 is disposed on shaft 700. Referring additionally to FIG. 5, formation of an anti-rotation bearing assembly in accordance with the present disclosure is accomplished by first positioning the snap ring 500 within the annular groove 122 formed in the inner surface 124 of the inner race 120 of the radial roller bearing 100. When properly seated, the body portion 502 of the snap ring 500 is received in the annular groove 122 of the inner race 120 so that the flat surface portion 518 of the snap ring 500 is disposed adjacent the flat surface portion 128 of the annular groove 122 of the inner race 120. As such, the flat surface portions 128 and 518 of the inner race 120 and the snap ring 500, respectively, prevent rotation of the snap ring 500 with respect to the inner race 120 of the radial roller bearing 100.

Next, the assembled radial roller bearing 100 and snap ring 500 are slidably positioned on shaft 700 so that the radially-inwardly depending projections 520 and 522 of the snap ring 500 are received within a key recess 704 that depends radially-inwardly from the outer surface 706 of the shaft 700, as best seen in FIG. 3B. As such, rotation of the snap ring 500 with respect to the shaft 700 is prevented, meaning that rotation of the inner race 120 of the radial roller bearing 100 with respect to the shaft 700 is also prevented. Note, for ease of viewing, the outer race 110 and the plurality of roller elements 130 have been excluded from the view shown in FIG. 3B.

Note, although FIG. 6 shows key recess 704 being disposed adjacent an end surface 708 of the shaft 700 on which the radial roller bearing 100 is mounted, the key recess 704 may also be formed axially-inwardly of the end surface 708 of the shaft 700. As such, positioning of the first and the second projections 520 and 522 of the snap ring 500 within the key recess 704 can not only prevent rotation of the inner race 120 with respect to the shaft 700, but the snap ring 500 can also axially fix the position of the inner race 120 of the radial roller bearing 100 on the shaft 700. As well, in alternate embodiments, when snap ring 500 is disposed within the annular groove 122 of the inner race 120 of the radial roller bearing 100, the inner perimeter surface 512 of the snap ring 500 may extend radially-inwardly beyond the inner surface 124 of the inner race 120. In such an embodiment, the inner perimeter surface 512 of the snap ring 500 is received within an annular groove (not shown) which extends radially-inwardly from the outer surface 706 of the shaft 700.

Figure 4A:
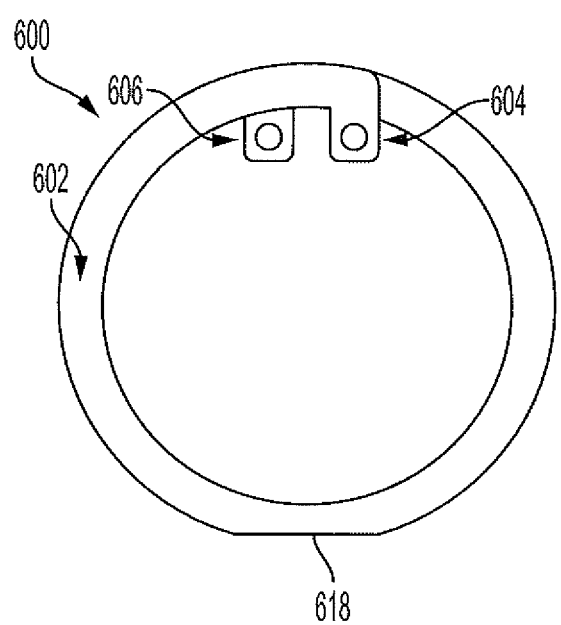
FIGS. 4A and 4B are side plan views of an anti-rotation snap ring in accordance with an alternate embodiment of the present invention.
Figure 4B:
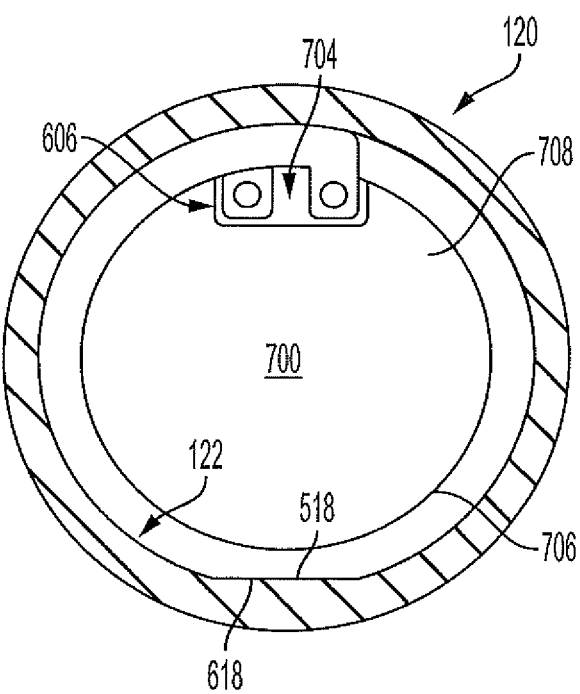

Referring additionally to FIGS. 4A and 4B, an alternate embodiment of an anti-rotation roller bearing assembly is shown. The assembly shown in FIGS. 4A and 4B differs primarily from the previously discussed embodiment in that the body portion 602 of the snap ring 600 does not include a gap (see 508 of FIG. 3A) defined between the first end portion 604 and the second end portion 606 thereof. Rather, the first and second end portions 604 and 606 of the body portion 612 overlap.

These and other modifications and variations to the invention may be practiced by those of ordinary skill in the art without departing from the spirit and scope of the invention, which is more particularly set forth in the appended claims. For example, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. A radial bearing assembly, comprising:
a housing including a cylindrical bore defined by an inner surface and a side wall;
a first recess extending radially-outwardly from the inner surface of the cylindrical bore;
a first snap ring including a pair of first projections extending radially-outwardly therefrom;
an outer bearing race including a cylindrical outer wall that defines a snap ring groove in which the first snap ring is located;
the outer bearing race having a cylindrical inner wall defining a central bore;
an inner bearing race including a cylindrical outer wall therein received in the central bore of the outer bearing race and a cylindrical inner wall defining a snap ring groove;
a plurality of roller elements received between the cylindrical inner wall of the outer race and the cylindrical outer wall of the inner race,
a shaft including a cylindrical outer wall defining a recess extending radially-inwardly from the outer wall of the shaft; and
a second snap ring located in the snap ring groove of the inner bearing race, the second snap ring including a pair of second projections extending radially-inwardly therefrom,
wherein the pair of first projections are received within the first recess, thereby preventing rotation of the first snap ring with respect to the housing and the pair of second projections are received within the second recess, thereby preventing rotation of the second snap ring with respect to the shaft.

2. The radial bearing assembly of claim 1, wherein each first projection extends radially-outwardly from first and the second end portions of a body portion of the first snap ring, the first and the second end portions of the first snap ring defining a gap therebetween.

3. The radial bearing assembly of claim 2, further comprising:
a flat surface formed on an inner perimeter surface of the first snap ring; and
the snap ring groove of the outer bearing race defining a flat surface that corresponds to the flat surface of the first snap ring so that rotation of the outer bearing race with respect to the first snap ring is prevented.

4. The radial bearing assembly of claim 3, wherein each second projection of the second snap ring extends radially-inwardly from first and the second end portions of a body portion of the second snap ring, the first and the second end portions of the second snap ring defining a gap therebetween.

5. The radial bearing assembly of claim 4, further comprising:
a flat surface formed on an outer perimeter surface of the second snap ring; and
the snap ring groove of the inner bearing race defining a flat surface that corresponds to the flat surface of the second snap ring so that rotation of the inner bearing race with respect to the second snap ring is prevented.

6. The radial bearing assembly of claim 1, wherein each projection of the first snap ring extends radially from first and the second end portions of a body portion of the second snap ring, wherein the first and the second end portions of the first snap ring overlap each other.

7. The radial bearing assembly of claim 6, further comprising:
a flat surface formed on an inner perimeter surface of the first snap ring; and
the snap ring groove of the outer bearing race defining a flat surface that corresponds to the flat surface of the first snap ring so that rotation of the outer bearing race with respect to the first snap ring is prevented.

8. The radial bearing assembly of claim 7, wherein each projection of the second snap ring extends radially-inwardly from first and the second end portions of a body portion of the second snap ring, wherein the first and the second end portions of the second snap ring overlap each other.

9. The radial bearing assembly of claim 8, further comprising:
a flat surface formed on an outer perimeter surface of the second snap ring; and
the snap ring groove of the inner bearing race defining a flat surface that corresponds to the flat surface of the second snap ring so that rotation of the inner bearing race with respect to the second snap ring is prevented.

10. A radial bearing assembly, comprising:
a housing including a cylindrical bore defined by an inner surface and a side wall;
a first recess extending radially-outwardly from the inner surface of the cylindrical bore;
a first snap ring including at least one first projection extending radially-outwardly therefrom, a flat surface formed on an inner perimeter surface of the first snap ring;
an outer bearing race including a cylindrical outer wall that defines a snap ring groove in which the first snap ring is located, the snap ring groove of the outer bearing race defining a flat surface that corresponds to the flat surface of the first snap ring so that rotation of the outer bearing race with respect to the first snap ring is prevented;

the outer bearing race having a cylindrical inner wall defining a central bore;

an inner bearing race including a cylindrical outer wall therein received in the central bore of the outer bearing race and a cylindrical inner wall defining a snap ring groove;

a plurality of roller elements received between the cylindrical inner wall of the outer race and the cylindrical outer wall of the inner race, a shaft including a cylindrical outer wall defining a recess extending radially-inwardly from the outer wall of the shaft; and a second snap ring located in the snap ring groove of the inner bearing race, the second snap ring including at least one second projection extending radially-inwardly therefrom, a flat surface formed on an outer perimeter surface of the second snap ring;

the snap ring groove of the inner bearing race defining a flat surface that corresponds to the flat surface of the second snap ring so that rotation of the inner bearing race with respect to the second snap ring is prevented, wherein the at least one first projection is received within the first recess, thereby preventing rotation of the first snap ring with respect to the housing and the at least one second projection is received within the second recess, thereby preventing rotation of the second snap ring with respect to the shaft.

* * * * *